(12) United States Patent
Song et al.

(10) Patent No.: US 12,400,599 B2
(45) Date of Patent: Aug. 26, 2025

(54) DISPLAY APPARATUS HAVING SIGNAL LINES ON A MULTI-LAYER METAL LAYER

(71) Applicants: Chengdu BOE Optoelectronics Technology Co., Ltd., Sichuan (CN); BOE Technology Group Co., Ltd., Beijing (CN)

(72) Inventors: Erlong Song, Beijing (CN); Hailong Yan, Beijing (CN); Jingli Zhang, Beijing (CN); Yagui Gao, Beijing (CN); Kai Zhang, Beijing (CN); Rui Cheng, Beijing (CN); Kunyan Shi, Beijing (CN); Yafei Chen, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/266,612

(22) PCT Filed: Mar. 8, 2022

(86) PCT No.: PCT/CN2022/079772
§ 371 (c)(1),
(2) Date: Jun. 12, 2023

(87) PCT Pub. No.: WO2023/168602
PCT Pub. Date: Sep. 14, 2023

(65) Prior Publication Data
US 2025/0022425 A1 Jan. 16, 2025

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2310/0267* (2013.01); *G09G 2310/0286* (2013.01)

(58) Field of Classification Search
CPC .................................................... G09G 3/3266
(Continued)

(56) References Cited

U.S. PATENT DOCUMENTS 8,248,568 B2 8/2012 Anjo et al.
8,634,049 B2 1/2014 Anjo et al.
(Continued)

FOREIGN PATENT DOCUMENTS

CN 103901690 A 7/2014
CN 108598118 A 9/2018
(Continued)

OTHER PUBLICATIONS

International Search Report and Written Opinion mailed on Oct. 9, 2022, in corresponding PCT/CN2022/079772, 12 pages.
(Continued)

*Primary Examiner* — Long D Pham
(74) *Attorney, Agent, or Firm* — XSENSUS LLP

(57) ABSTRACT

The present disclosure provides a display apparatus, a display panel and a preparation method. The display panel includes a base substrate, a driving circuit provided on a side of the base substrate and a multi-layer metal layer: the base substrate includes a display region and a peripheral region located on a periphery of the display region; the driving circuit includes a peripheral circuit and a pixel circuit, the peripheral circuit is located at the peripheral region, the pixel circuit is located at the display region, and the peripheral circuit is connected with the pixel circuit and configured to
(Continued)

provide a driving signal to the pixel circuit; the peripheral circuit includes a plurality of signal lines distributed in at least two metal layers.

19 Claims, 6 Drawing Sheets

(58) Field of Classification Search
USPC .......................................................... 345/204
See application file for complete search history.

(56) References Cited

U.S. PATENT DOCUMENTS

| | | | |
|---|---|---|---|
| 8,867,011 | B2 | 10/2014 | Anjo et al. |
| 9,041,893 | B2 | 5/2015 | Anjo et al. |
| 9,274,389 | B2 | 3/2016 | Kang et al. |
| 9,389,471 | B2 | 7/2016 | Anjo et al. |
| 9,484,547 | B2 | 11/2016 | Pyon |
| 9,576,985 | B2 | 2/2017 | Anjo et al. |
| 9,804,456 | B2 | 10/2017 | Anjo et al. |
| 9,934,727 | B2 | 4/2018 | Pyon |
| 9,964,817 | B2 | 5/2018 | Anjo et al. |
| 10,312,312 | B2 | 6/2019 | Kim et al. |
| 10,446,081 | B2 | 10/2019 | Pyon |
| 10,847,598 | B2 | 11/2020 | Gu |
| 11,069,294 | B2 | 7/2021 | Pyon |
| 2009/0268145 | A1 | 10/2009 | Anjo et al. |
| 2012/0300152 | A1 | 11/2012 | Anjo et al. |
| 2012/0313905 | A1 | 12/2012 | Kang et al. |
| 2014/0111755 | A1 | 4/2014 | Anjo et al. |
| 2015/0009445 | A1 | 1/2015 | Anjo et al. |
| 2015/0116295 | A1 | 4/2015 | Pyon |
| 2015/0227010 | A1 | 8/2015 | Anjo et al. |
| 2015/0270291 | A1 | 9/2015 | Tian et al. |
| 2016/0284735 | A1 | 9/2016 | Anjo et al. |
| 2017/0025066 | A1 | 1/2017 | Pyon |
| 2017/0123283 | A1 | 5/2017 | Anjo et al. |
| 2017/0148391 | A1 | 5/2017 | Pyon |
| 2017/0329189 | A1 | 11/2017 | Kim et al. |
| 2018/0046043 | A1 | 2/2018 | Anjo et al. |
| 2019/0272789 | A1 | 9/2019 | Pyon |
| 2020/0006457 | A1 | 1/2020 | Gu |
| 2020/0119127 | A1 | 4/2020 | Tian et al. |
| 2021/0350749 | A1 | 11/2021 | Pyon |
| 2022/0115487 | A1* | 4/2022 | Shu .................... H10K 59/1216 |
| 2022/0181431 | A1* | 6/2022 | Youn .................... H10K 59/122 |

FOREIGN PATENT DOCUMENTS

| | | |
|---|---|---|
| CN | 108598143 A | 9/2018 |
| CN | 108630144 A | 10/2018 |
| CN | 108648695 A | 10/2018 |
| CN | 113141779 A | 7/2021 |
| CN | 113362770 A | 9/2021 |
| CN | 114005411 A | 2/2022 |
| WO | 2016/108664 A1 | 7/2016 |
| WO | 2021/097690 A1 | 5/2021 |
| WO | 2021226879 A1 | 11/2021 |

OTHER PUBLICATIONS

The First Office Action mailed Jun. 20, 2025, in Chinese Application No. 202280000382.0, 20 pages including English translation.

* cited by examiner

DISPLAY APPARATUS HAVING SIGNAL LINES ON A MULTI-LAYER METAL LAYER

CROSS-REFERENCE TO RELATED APPLICATION

The present application is a U.S. National Stage of International Application No. PCT/CN2022/079772, filed on Mar. 8, 2022, the entire content of which is incorporated herein by reference for all purposes. No new matter has been introduced.

TECHNICAL FIELD

The present disclosure relates to a field of display technology, and more particularly to a display apparatus, a display panel and a preparation method.

BACKGROUND

With continuous development of the display technology, people's requirements for the display technology are gradually increasing.

A screen bezel refers a distance from a display region (Active Aare, AA region) to a screen boundary. Currently, consumers have higher requirements for the bezels of the display screens and expect to have a display screen with a narrower bezel. However, the bezels of the display screens in the prior art are still relatively wide, which cannot meet the requirements of the consumers.

It should be noted that the information disclosed in the above BACKGROUND section is only for enhancing the understanding of the background of the present disclosure, and thus may include information that does not constitute the prior art known to those of ordinary skill in the art.

SUMMARY

An objective of the present disclosure is to provide a display apparatus, a display panel and a preparation method, so as to reduce a width of a bezel of a display panel and meet consumers' demand for the narrow bezel.

In order to achieve the above objective of the present disclosure, the following technical solutions are adopted in the present disclosure:

According to a first aspect of the present disclosure, a display panel is provided, including a base substrate, a driving circuit provided on a side of the base substrate and a multi-layer metal layer:

wherein the base substrate includes a display region and a peripheral region located at a periphery of the display region;

the driving circuit includes a peripheral circuit and a pixel circuit, the peripheral circuit is located at the peripheral region, the pixel circuit is located at the display region, and the peripheral circuit is connected with the pixel circuit and configured to provide a driving signal to the pixel circuit;

the peripheral circuit includes a plurality of signal lines distributed in at least two layers of the multi-layer metal layer.

In an exemplary embodiment of the present disclosure, the peripheral circuit includes a gate driving circuit and a light-emitting control circuit, and each of the gate driving circuit and the light-emitting control circuit includes the plurality of signal lines:

the plurality of signal lines of the gate driving circuit are distributed in at least two layers of the multi-layer metal layer;

or/and the plurality of signal lines of the light-emitting control circuit are distributed in at least two layers of the multi-layer metal layer.

In an exemplary embodiment of the present disclosure, the multi-layer metal layer includes a first metal layer and a second metal layer arranged in sequence along a direction away from the base substrate:

among the plurality of signal lines, a part of the signal lines are distributed in the first metal layer, and a part of the signal lines are distributed in the second metal layer; and the plurality of signal lines include a clock signal line and/or a voltage signal line.

In an exemplary embodiment of the present disclosure, wherein the peripheral circuit includes the gate driving circuit, the gate driving circuit includes a plurality of first shift register units in a cascade connection and the plurality of signal lines, and the first shift register unit includes a transistor:

the clock signal line is configured to transmit a clock signal to the first shift register unit, and the voltage signal line is configured to transmit a voltage signal to the first shift register unit;

the first metal layer includes a source and a drain of the transistor in the first shift register unit;

the second metal layer is provided on a side of the first shift register unit away from the base substrate;

an orthographic projection of the signal line, distributed in the second metal layer, in the gate driving circuit on the base substrate at least partially overlaps with an orthographic projection of the first shift register unit on the base substrate.

In an exemplary embodiment of the present disclosure, wherein the peripheral circuit includes the light-emitting control circuit, the light-emitting control circuit includes a plurality of second shift register units in a cascade connection and the plurality of signal lines, and the second shift register unit includes a transistor:

the clock signal line is configured to transmit a clock signal to the second shift register unit, and the voltage signal line is configured to transmit a voltage signal to the second shift register unit;

the first metal layer includes a source and a drain of the transistor in the second shift register unit;

the second metal layer is provided on a side of the second shift register unit away from the base substrate;

an orthographic projection of the signal line, distributed in the second metal layer, in the light-emitting control circuit on the base substrate at least partially overlaps with an orthographic projection of the second shift register unit on the base substrate.

In an exemplary embodiment of the present disclosure, the display panel further includes an initial signal line, the initial signal line located at the peripheral region and configured to transmit an initial signal to the pixel circuit, wherein the initial signal line is distributed in the second metal layer.

In an exemplary embodiment of the present disclosure, an orthographic projection of the initial signal line on the base substrate at least partially overlaps with the orthographic projection of the first shift register unit on the base substrate.

In an exemplary embodiment of the present disclosure, the display panel further includes an electrical connection line, wherein the peripheral circuit is connected with the pixel circuit through the electrical connection line:

the initial signal line is provided on a side of the electrical connection line away from the base substrate;

an orthographic projection of the initial signal line on the base substrate at least partially overlaps with an orthographic projection of the electrical connection line on the base substrate.

In an exemplary embodiment of the present disclosure, wherein the gate driving circuit includes a first gate driving circuit and a second gate driving circuit, the first shift register unit includes a first sub-shift register unit and a second sub-shift register unit, the first gate driving circuit includes the first sub-shift register unit, and the second gate driving circuit includes the second sub-shift register unit, the second gate driving circuit is located on a side of the first gate driving circuit close to the display region:

the orthographic projection of the initial signal line on the base substrate at least partially overlaps with an orthographic projection of the second sub-shift register unit on the base substrate.

In an exemplary embodiment of the present disclosure, wherein the pixel circuit includes a low temperature polysilicon transistor and an oxide transistor;

the first gate driving circuit is configured to drive the oxide transistor, and the second gate driving circuit is configured to drive the low temperature polysilicon transistor.

In an exemplary embodiment of the present disclosure, the display panel further includes:

a cathode signal line, provided on a side of the base substrate and located at the peripheral region, wherein the cathode signal line is distributed in the first metal layer;

a cathode lapping line with an end lapping the cathode signal line, wherein at least a part of the cathode lapping line is distributed in the second metal layer.

In an exemplary embodiment of the present disclosure, the cathode signal line is provided on a side of the light-emitting control circuit away from the display region:

an orthographic projection of the cathode lapping line on the base substrate at least partially overlaps with the orthographic projection of the second shift register unit on the base substrate.

In an exemplary embodiment of the present disclosure, the display panel further includes:

a planarization layer, provided between the first metal layer and the second metal layer, wherein an orthographic projection of the planarization layer on the base substrate covers a gap between orthographic projections of the first sub-shift register unit and the second sub-shift register unit on the base substrate.

In an exemplary embodiment of the present disclosure, the display panel further includes:

an encapsulation layer, provided on sides of the driving circuit and the multi-layer metal layer away from the base substrate;

wherein the encapsulation layer includes a first inorganic layer and a second inorganic layer arranged in sequence along a direction away from the base substrate, an orthographic projection of the second inorganic layer on the base substrate covers an orthographic projection of the first inorganic layer on the base substrate, and an area of the orthographic projection of the second inorganic layer on the base substrate is greater than an area of the orthographic projection of the first inorganic layer on the base substrate.

In an exemplary embodiment of the present disclosure, the first inorganic layer is provided with a first surface away from the base substrate and a first side wall away from the display region:

the second inorganic layer is in contact with the first side wall and at least a part of the first surface.

According to a second aspect of the present disclosure, a preparation method of a display panel is provided and includes:

providing a base substrate, wherein the base substrate includes a display region and a peripheral region located at a periphery of the display region;

forming a driving circuit and a multi-layer metal layer on a side of the base substrate, wherein the driving circuit includes a peripheral circuit and a pixel circuit, the peripheral circuit is located at the peripheral region, the pixel circuit is located at the display region, and the peripheral circuit is connected with the pixel circuit and configured to provide a driving signal to the pixel circuit: the peripheral circuit includes a plurality of signal lines distributed in at least two layers of the multi-layer metal layer.

In an exemplary embodiment of the present disclosure, the preparation method further includes:

forming a first inorganic layer on sides of the driving circuit and the multi-layer metal layer away from the base substrate;

forming a second inorganic layer on a side of the first inorganic layer away from the base substrate, wherein an orthographic projection of the second inorganic layer on the base substrate covers an orthographic projection of the first inorganic layer on the base substrate, and an area of the orthographic projection of the second inorganic layer on the base substrate is greater than an area of the orthographic projection of the first inorganic layer on the base substrate.

According to a third aspect of the present disclosure, a display apparatus is provided and includes the display panel according to the first aspect.

The display panel provided by the present disclosure distributes the plurality of signal lines in the peripheral circuit in at least two layer of the multi-layer metal layer to reduce the space occupied by the peripheral circuit along a direction parallel to the base substrate, which in turn helps to reduce a size of the space occupied by the peripheral circuit in the peripheral region, and reduces a size of the peripheral region, i.e. reduce a width of the bezel of the display panel, and meet the consumer's demand for the narrow bezel.

BRIEF DESCRIPTION OF THE DRAWINGS

The above-mentioned and other features and advantages of the present disclosure will become more apparent by describing the exemplary embodiments thereof in detail with reference to the accompanying drawings.

Figure 1:
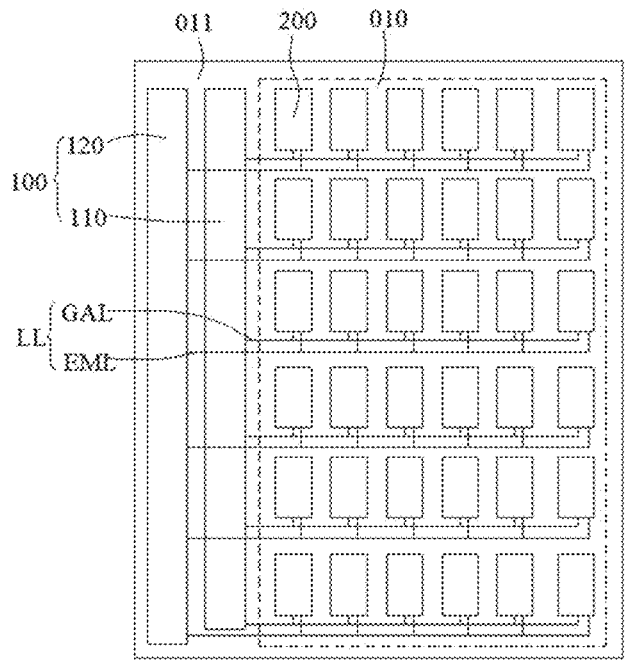
FIG. 1 is a structural diagram of a peripheral circuit at a location of a display panel in an exemplary embodiment of the present disclosure.

Reference numerals of main components in the drawings are illustrated as follows:

01—base substrate; 010—display region; 011—peripheral region; 100—peripheral circuit; 110—gate driving circuit; 111—first shift register unit; 1111—first sub-shift register unit; 1112—second sub-shift register unit; 112—signal line; 130—first gate driving circuit; 140—second gate driving circuit; 120—light-emitting control circuit; 121—second shift register unit; 122—signal line; 200—pixel circuit; 10—first active layer; 11—first gate insulation layer; 12—first gate metal layer; 13—first interlayer dielectric layer; 14—buffer layer; 20—second active layer; 21—second gate insulation layer; 22—second gate metal layer; 23—second interlayer dielectric layer; 30—first metal layer; 31—planarization layer; 40—second metal layer; 50—encapsulation layer; 51—first inorganic layer; 52—second inorganic layer; 60—buffer layer; VSS—cathode signal line; VSS1—cathode lapping line; VIL—initial signal line; LL—electrical connection line; GAL—gate line; EML—light-emitting control signal line.

DETAILED DESCRIPTION

Example embodiments will now be described more fully with reference to the accompanying drawings. However, the example embodiments may be implemented in various forms, and should not be construed as being limited to the examples set forth herein; on the contrary, the provision of these embodiments makes the present disclosure more comprehensive and complete, and fully conveys the concept of the example embodiments to those skilled in the art. The described features, structures or characteristics may be combined in one or more embodiments in any suitable manner. In the following description, many specific details are provided to give a sufficient understanding of the embodiments of the present disclosure.

In the drawings, the thicknesses of regions and layers may be exaggerated for clarity. The same reference numerals in the drawings represent the same or similar structures, and thus their detailed descriptions will be omitted.

The described features, structures or characteristics may be combined in one or more embodiments in any suitable manner. In the following description, many specific details are provided to give a sufficient understanding of the embodiments of the present disclosure. However, those skilled in the art will realize that the technical solutions of the present disclosure can be practiced without one or more of the specific details, or other methods, components, materials, etc. can be used. In other cases, well-known structures, materials, or operations are not illustrated or described in detail to avoid obscuring the main technical ideas of the present disclosure.

When a structure is "on" another structure, it may mean that a certain structure is integrally formed on other structures, or that a certain structure is "directly" arranged on other structures, or that a certain structure is "indirectly" arranged on other structures through another structure.

The terms "a", "an", and "the" are used to indicate the presence of one or more elements/components/etc.: the terms "include" and "have" are used to mean open-ended inclusion and means that there may be additional elements/components/etc. in addition to the listed elements/components/etc. The expression "first", "second", and so forth are used only as example labels, and are not a numerical restriction to the objects.

In the related art, Low Temperature Poly-Silicon (LTPS) is used as an active layer of a low temperature polysilicon transistor, and an oxide semiconductor (Oxide) is used as an active layer of an oxide thin film transistor, such as indium gallium zinc oxide, indium gallium tin oxide, and the like. The low temperature polysilicon thin film transistor has advantages of high mobility and fast charging, and the oxide thin film transistor has advantages of a low leakage current. The integration of the low temperature polysilicon thin film transistor and the oxide thin film transistor on one display panel to form a Low Temperature Polycrystalline Oxide (LTPO) display panel is able to take advantages of both and achieve low frequency drive, so as to reduce power consumption and improve a display quality.

A pixel circuit of the LTPO display panel includes the low temperature polysilicon transistor and the oxide thin film transistor. A gate driving circuit (Gate on array, GOA) needs to provide both a high level gate driving signal and a low level gate driving signal simultaneously, and it contains a large number of transistors and occupies a large space. Thus, a bezel of the LTPO display panel is relatively wide, which cannot meet r consumers demand for a narrow bezel.

Figure 4:
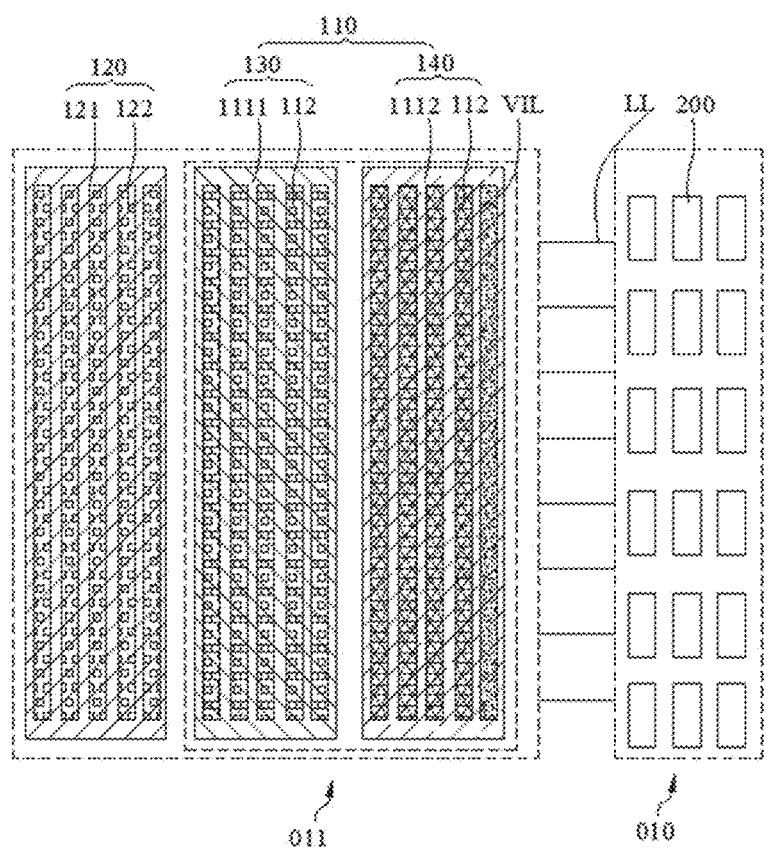
FIG. 4 is a plane schematic diagram of a distribution of a plurality of signal lines of a peripheral circuit in an exemplary embodiment of the present disclosure.
Figure 7:
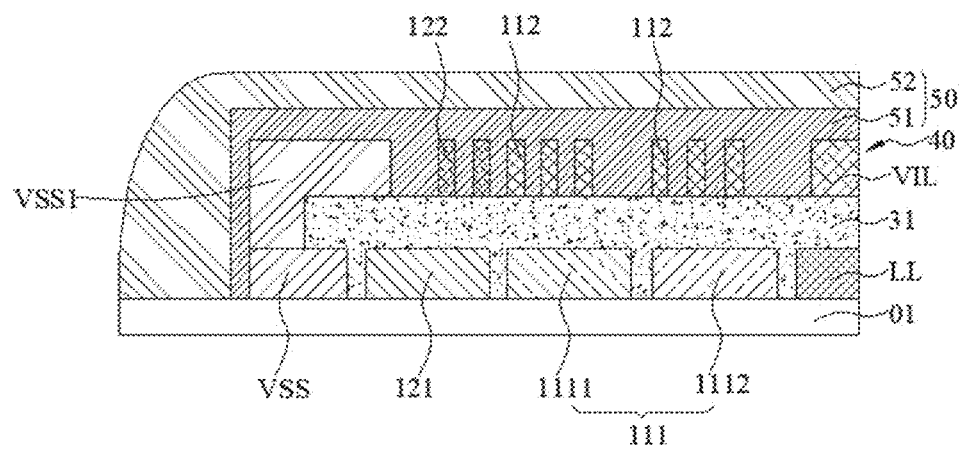
FIG. 7 is a sectional schematic diagram of a distribution of a plurality of signal lines of a peripheral circuit in another exemplary embodiment of the present disclosure.

As illustrated in FIGS. 1, 4 and 7, the present disclosure provides a display panel, and the display panel includes a base substrate 01, a driving circuit provided on a side of the base substrate 01 and a multi-layer metal layer. The base substrate 01 includes a display region 010 and a peripheral region 011 located at a periphery of the display region 010; the driving circuit includes a peripheral circuit 100 and a pixel circuit 200, the peripheral circuit 100 is located at the peripheral region 011, the pixel circuit 200 is located at the display region 010, and the peripheral circuit 100 is connected with the pixel circuit 200 and configured to provide a driving signal to the pixel circuit 200; the peripheral circuit includes a plurality of signal lines distributed in at least two layers of the multi-layer metal layer.

The display panel provided by the present disclosure distributes the plurality of signal lines in the peripheral circuit 100 in at least two layer of the multi-layer metal layer to reduce a space occupied by the peripheral circuit 100 along a direction parallel to the base substrate 01, which in turn helps to reduce a size of the space occupied by the peripheral circuit 100 in the peripheral region 011 and reduce a size of the peripheral region 011, i.e. reduce a width of the bezel of the display panel, and meet consumers demand for the narrow bezel.

Components of the display panel provided by the arrangement of the present disclosure will be described in detail below with reference to the accompanying drawings.

The present disclosure provides a display panel, which may be an Organic Light-Emitting Diode (OLED) display panel, such as an AMOLED (Active-Matrix Organic Light-Emitting Diode) display panel, or a Quantum Dot Light Emitting Diodes (QLED) display panel, a Micro Light Emitting Diodes (Micro LED) display panels, and the like, which are not limited in the present disclosure herein.

As illustrated in FIG. 1, the display panel includes a base substrate 01, a driving circuit provided on a side of the base substrate 01 and a multi-layer metal layer.

The base substrate 01 includes a display region 010 and a peripheral region 011 located on a periphery of the display region 010, the display region 010 may be used to display an image. The base substrate 01 may be a base substrate of an inorganic material or a base substrate of an organic material. For example, in an embodiment of the present disclosure, the material of the base substrate 01 may be a glass material such as soda-lime glass, quartz glass, sapphire glass and the like, or may be a metal material such as stainless steel, aluminum, nickel and the like. In another embodiment of the present disclosure, the material of the base substrate 01 may be polymethyl methacrylate (PMMA), polyvinyl alcohol (PVA), polyvinyl phenol (PVP), polyether sulfone (PES), polyimide, polyamide, polyacetal, poly carbonate (PC), polyethylene terephthalate (PET), polyethylene naphthalate (PEN) or a combination thereof. The base substrate 01 may also be a flexible base substrate 01, and for example, in an embodiment of the present disclosure, the material of the base substrate 01 may be polyimide (PI). The base substrate 01 may also be a composite of multiple layers of materials, and for example, in an embodiment of the present disclosure, the base substrate 01 may include a bottom film, a pressure-sensitive adhesive layer, a first polyimide layer and a second polyimide layer sequentially stacked.

The driving circuit is provided on a side of the base substrate 01, the driving circuit includes a peripheral circuit 100 and a pixel circuit 200, the peripheral circuit 100 is located at the peripheral region 011, and the pixel circuit 200 is located at the display region 010. The pixel circuit 200 may be configured to drive a light-emitting component of the OLED display panel to emit light. The pixel circuit 200 may be a pixel circuit 200 such as 7T1C, 7T2C, 6T1C, or 6T2C and the like, and its structure is not particularly limited herein. nTmC represents one pixel circuit 200 including n transistors (denoted by a letter "T") and m capacitors (denoted by a letter "C"). The pixel circuit 200 may be arranged in an array in the display region 010, thereby forming a matrix structure with a plurality of rows and a plurality of columns.

The peripheral circuit 100 includes a gate driving circuit 110 and a light-emitting control circuit 120. The display panel further includes an electrical connection line LL, and the peripheral circuit 100 is connected with the pixel circuit 200 through the electrical connection line LL. For example, the electrical connection line LL may include a light-emitting control signal line EML and a gate line GAL. The gate driving circuit 110 is connected with the pixel circuit 200 through the gate line GAL, and the light-emitting control circuit 120 is connected with the pixel circuit 200 through the light-emitting control signal line EML.

As illustrated in FIGS. 4 to 7, each of the gate driving circuit 110 and the light-emitting control circuit 120 includes a plurality of signal lines. The plurality of signal lines of the gate driving circuit 110 and/or the plurality of signal lines of the light-emitting control circuit 120 are distributed in at least two layers of the multi-layer metal layer. For example, in some embodiments of the present disclosure, the plurality of signal lines 112 of the gate driving circuit 110 are distributed in at least two layers of the multi-layer metal layer, in some other embodiments, the plurality of signal lines 122 of the light-emitting control circuit 120 are distributed in at least two layers of the multi-layer metal layer, and in some other embodiments, the plurality of signal lines 112 of the gate driving circuit 110 and the plurality of signal lines 122 of the light-emitting control circuit 120 are distributed in at least two layers of the multi-layer metal layer.

Figure 2:
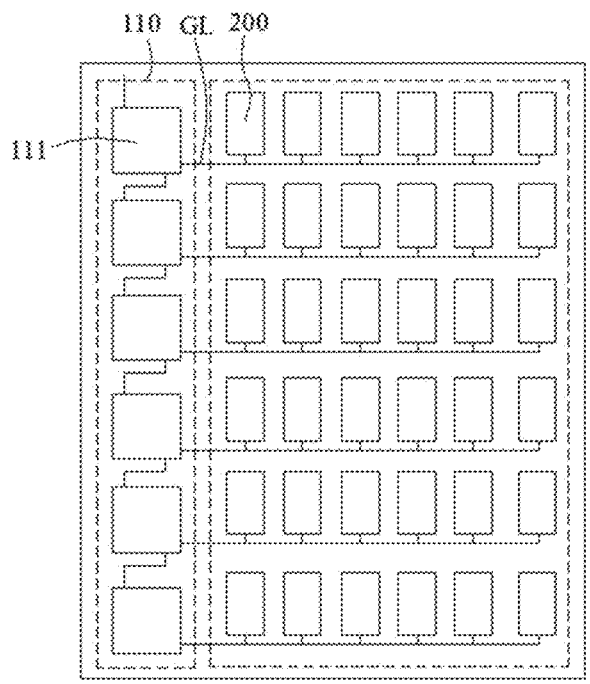
FIG. 2 is a structural diagram of a gate driving circuit of a display panel in an exemplary embodiment of the present disclosure.

As illustrated in FIG. 1 and FIG. 2, in some embodiments of the present disclosure, the gate driving circuit 110 may be arranged on a single side of the display region 010, and provide a gate driving signal from the single side to the pixel circuit 200 row by row through each gate line GAL, i.e. driven in a single-sided drive manner. Of course, the gate driving circuits 110 may also be arranged on two sides of the display region 010, and a gate driving signal is simultaneously provided from the two sides to each pixel circuit 200 row by row through the gate driving circuits 110 on the two sides, i.e. driven in a double-sided manner. Of course, the gate driving circuits 110 on the two sides may also alternately provide the gate driving signal from the two sides to each pixel circuit 200 row by row; i.e., driven in a crossed manner.

The display panel includes a multi-layer metal layer provided on a side of the base substrate 01. Specifically, the display panel may include two, three or more layers of the multi-layer metal layer. The peripheral circuit 100, such as the gate driving circuit 110 and the light-emitting control circuit 120, includes a plurality of signal lines distributed in at least two layers of the multi-layer metal layer. For example, the plurality of signal lines of the gate driving circuit 110 and the light-emitting control circuit 120 may be distributed in two, three or more layers of the multi-layer metal layer.

Figure 6:
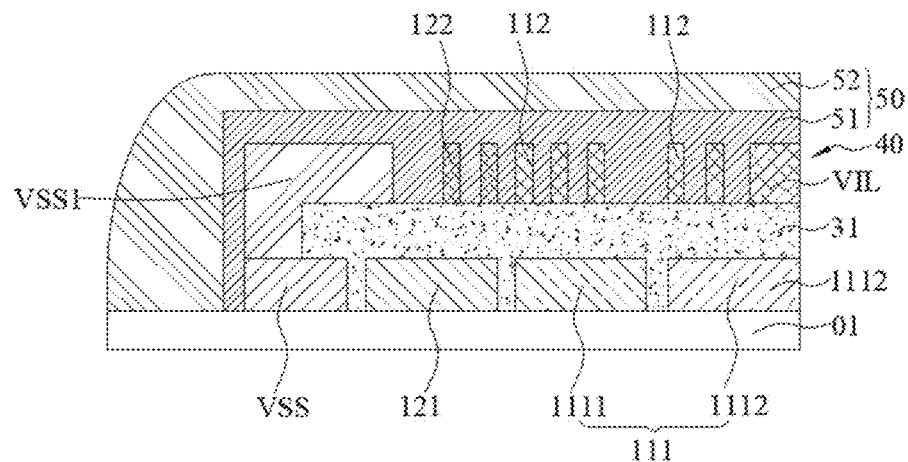
FIG. 6 is a sectional schematic diagram of a distribution of a plurality of signal lines of a peripheral circuit in an exemplary embodiment of the present disclosure.
Figure 8:
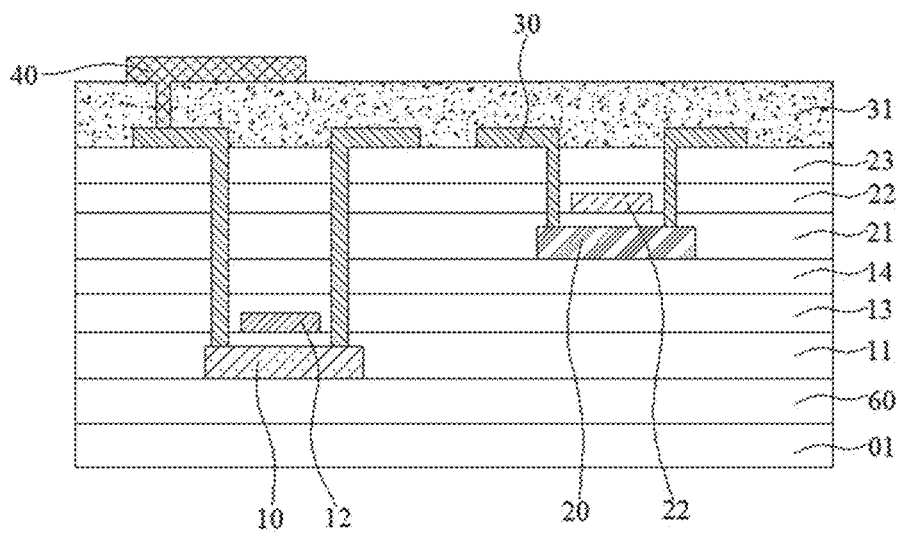
FIG. 8 is a sectional schematic diagram of a display region of a display panel in an exemplary embodiment of the present disclosure.

As illustrated in FIGS. 6 to 8, in some embodiments of the present disclosure, the multi-layer metal layer includes a first metal layer 30 and a second metal layer 40 arranged in sequence along a direction away from the base substrate 01. Among the plurality of signal lines, a part of the signal lines are distributed in the first metal layer 30, and a part of the signal lines are distributed in the second metal layer 40. The plurality of signal lines include a clock signal line and/or a voltage signal line, the clock signal line is configured to transmit a clock signal and the voltage signal line is configured to transmit a voltage signal. For example, the clock signal line is distributed in the first metal layer 30, and the voltage signal line is distributed in the second metal layer 40; or several clock signal lines in the clock signal lines are distributed in the first metal layer 30, and the rest of the clock signal lines are distributed in the second metal layer 40: or several of the voltage signal lines in the voltage signal lines are distributed in the first metal layer 30, and the rest of the voltage signal lines are distributed in the second metal layer 40, which is not limited in the present disclosure herein.

In the present disclosure, the plurality of signal lines, such as the clock signal lines and the voltage signal lines, in the peripheral circuit 100, such as the gate driving circuit 110 and/or the light-emitting control circuit 120, are distributed in at least two layers of the multi-layer metal layer, i.e., the plurality of signal lines are stacked. This design manner helps to reduce the space occupied by the clock signal lines and the voltage signal lines along the direction parallel to the base substrate 01, thereby providing a basis for achieving a narrow bezel design.

Figure 5:
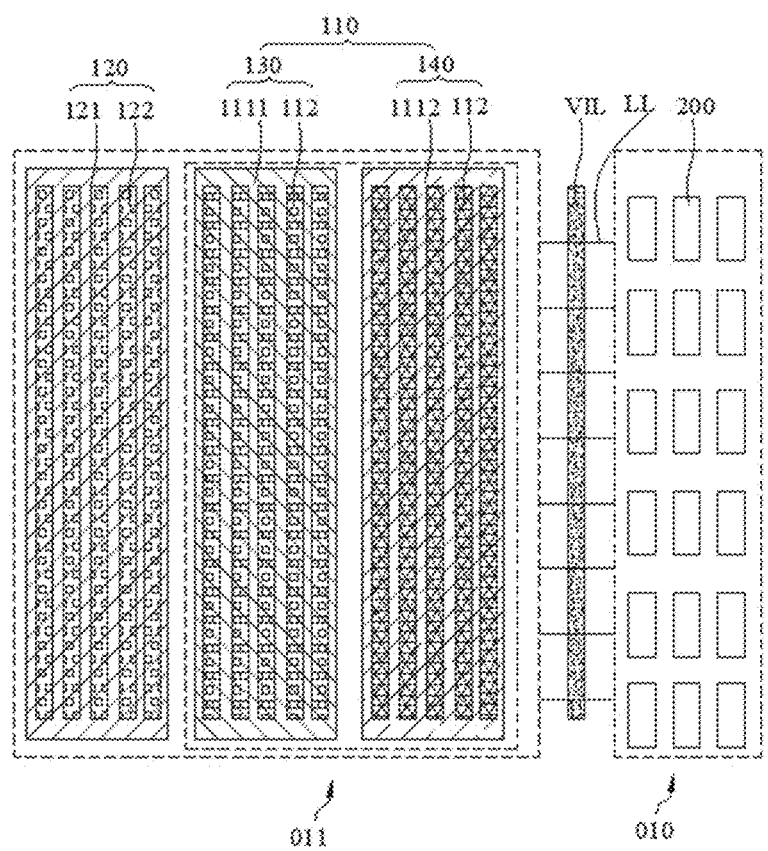
FIG. 5 is a plane schematic diagram of a distribution of a plurality of signal lines of a peripheral circuit in another exemplary embodiment of the present disclosure.

As illustrated in FIG. 2, FIG. 4 and FIG. 5, in some embodiments of the present disclosure, the gate driving circuit 110 further includes a plurality of first shift register units 111 in a cascade connection, and the plurality of first shift register units 111 in the cascade connection are each connected to a respective gate line GAL one by one, so as to provide the gate driving signal to the corresponding pixel circuit 200.

The first shift register unit 111 is independently provided with a gate driving signal output terminal and a cascade signal output terminal, outputs a gate driving signal to the gate line GAL connected thereto through the gate driving signal output terminal, and outputs a cascade signal through the cascade signal output terminal. For example, in each of two adjacent first shift register units 111, a signal input terminal of the first shift register unit 111 at a subsequent stage is connected with a cascade signal output terminal of the first shift register unit 111 at a previous stage.

The voltage signal line in the gate driving circuit 110 is configured to transmit a voltage to the first shift register unit 111. There may be a plurality of voltage signal lines. For example, the gate driving circuit 110 may include N voltage signal lines, namely, a first voltage signal line, a second voltage signal line, a third voltage signal line, . . . , a Nth voltage signal line, and different voltage signal lines transmit different voltage signals. A single first shift register unit 111 may be connected with one or a plurality of voltage signal lines, which is not limited in the present disclosure herein. The clock-signal line is configured to transmit a clock signal to the first shift register unit 111. There may be a plurality of clock signal lines. For example, the gate driving circuit 110 may include N clock signal lines, namely, a first clock signal line, a second clock signal line, a third clock signal line, . . . , a Nth clock signal line, and different clock signal lines transmit different clock signals. A single first shift register unit 111 may be connected with one or a plurality of clock signal lines, which is not limited in the present disclosure herein. The first shift register unit 111 outputs the gate driving signal to the gate line GAL according to the clock signal transmitted by the clock signal line and other signal, such as the voltage signal, transmitted by other signal line and then provides the gate driving signal to the corresponding pixel circuit 200.

As illustrated in FIGS. 6 to 8, in some embodiments of the present disclosure, the first shift register unit 111 includes a transistor, the first metal layer 30 includes a source and a drain of the transistor in the first shift register unit 111, and the second metal layer 40 is provided on a side of the first shift register unit 111 away from the base substrate 01. An orthographic projection of the signal line 112, distributed in the second metal layer 40, in the gate driving circuit 110 on the base substrate 01 at least partially overlaps with an orthographic projection of the first shift register unit 111 on the base substrate 01. That is, the signal line 112 distributed in the second metal layer 40 is located above the first shift register unit 111. For example, when the clock signal line is distributed in the second metal layer 40, an orthographic projection of the clock signal line on the base substrate 01 at least partially overlaps with the orthographic projection of the first shift register unit 111 on the base substrate 01: when the voltage signal line is distributed on the second metal layer 40, an orthographic projection of the voltage signal line on the base substrate 01 overlaps at least partially with the orthographic projection of the first shift register unit 111 on the base substrate 01.

Figure 3:
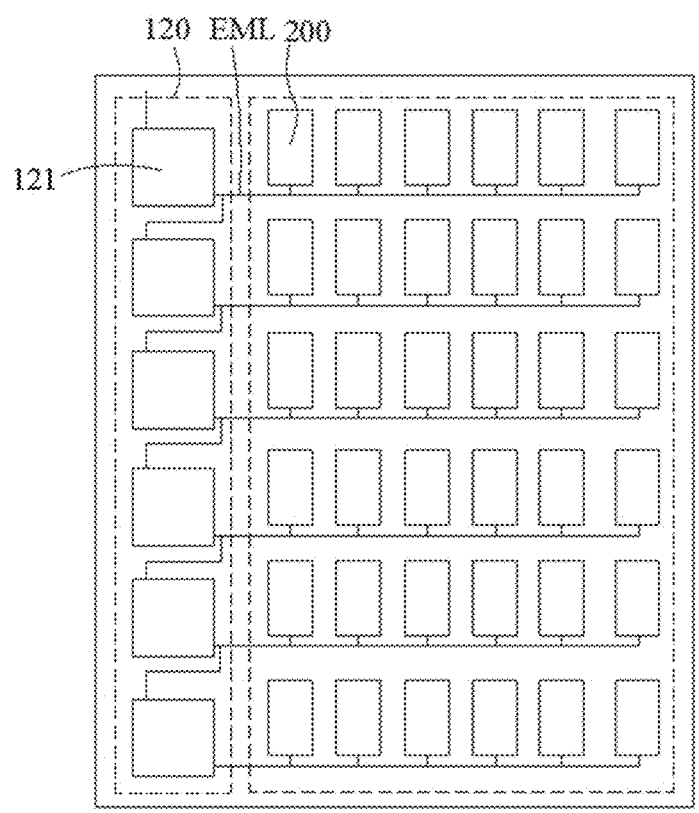
FIG. 3 is a structural diagram of a light-emitting control circuit of a the display panel in an exemplary embodiment of the present disclosure.

As illustrated in FIG. 3, FIG. 4 and FIG. 5, in some embodiments of the present disclosure, the light-emitting control circuit 120 further includes a plurality of second shift register units 121 in a cascade connection, and signal output terminals of the plurality of second shift register units 121 in a cascade connection are each connected to a respective light-emitting control signal line EML one by one, so as to provide the light-emitting control signal to the corresponding pixel circuit 200. Among the plurality of second shift register units 121 in a cascade connection, except for a second shift register unit 121 at a last stage, a signal output terminal of a second shift register unit 121 at each stage other than the last stage is connected with a signal input terminal of a second shift register unit 121 at a subsequent stage adjacent thereto.

The voltage signal line in the light-emitting control circuit 120 is configured to transmit a voltage to the second shift register unit 121, and the clock signal line is configured to transmit a clock signal to the second shift register unit 121. Similarly, there may be a plurality of voltage signal lines and a plurality of clock signal lines in the light-emitting control circuit 120, different clock signal lines may transmit different clock signals, and different voltage signal lines may transmit different voltage signals. The second shift register unit 121 outputs the light-emitting control signal to the light-emitting control signal line EML according to the clock signal transmitted by the clock signal line and other signal, such as the voltage signal, transmitted by other signal lines and then provides the light-emitting control signal to the corresponding pixel circuit 200.

As illustrated in FIGS. 6 to 8, in some embodiments of the present disclosure, the second shift register unit 121 includes a transistor, the first metal layer 30 includes a source and a drain of the transistor in the second shift register unit 121, and the second metal layer 40 is provided on a side of the second shift register unit 121 away from the base substrate 01. An orthographic projection of the signal line 122, distributed in the second metal layer 40, in the light-emitting control circuit 120 on the base substrate 01 at least partially overlaps with an orthographic projection of the second shift register unit 121 on the base substrate 01.

Further, the pixel circuit 200 also includes a plurality of transistors, and the first metal layer 30 also includes sources and drains of the transistors in the pixel circuit 200.

Each circuit in the driving circuit, such as the gate driving circuit 110, the light-emitting control circuit 120 and the pixel circuit 200, contains transistors formed on a side of the base substrate 01.

In some embodiments of the present disclosure, the transistor(s) contained in the pixel circuit 200 may be a low temperature polysilicon transistor, or an oxide transistor, or both a low temperature polysilicon transistor and an oxide transistor. Taking the pixel circuit 200 including the oxide transistor and the low temperature polysilicon transistor as an example, a structure of the display panel in the present application is further illustrated.

As illustrated in FIG. 8, the display panel further includes a first active layer 10, a first gate insulation layer 11, a first gate metal layer 12, a first interlayer dielectric layer 13, a buffer layer 14, a second active layer 20, a second gate insulation layer 21, a second gate metal layer 22 and a second interlayer dielectric layer 23.

The first active layer 10 is provided on a side of the base substrate 01. A material of the first active layer 10 includes polysilicon, and the first active layer is configured to form an active region of the low temperature polysilicon transistor. The first gate insulation layer 11 is provided on a side of the first active layer 10 away from the base substrate 01, and the first gate insulation layer 11 covers the first active layer 10. The first gate metal layer 12 is provided on a side of the first gate insulation layer 11 away from the base substrate 01, and the first gate metal layer 12 includes a gate of the low temperature polysilicon transistor. The first interlayer dielectric layer 13 is provided on a side of the first gate metal layer 12 away from the base substrate 01, and the first interlayer dielectric layer 13 covers a surface of the first gate metal layer 12. The buffer layer 14 is provided on a side of the first interlayer dielectric layer 13 away from the base substrate 01.

The second active layer 20 is provided on a side of the buffer layer 14 away from the base substrate 01. A material of the second active layer 20 contains an oxide, such as indium gallium zinc oxide (IGZO), and the second active layer is configured to form an active region of the oxide transistor. An orthographic projection of the second active layer 20 on the base substrate 01 does not overlap with an orthographic projection of the first active layer 10 on the base substrate 01. The second gate insulation layer 21 is provided on a side of the second active layer 20 away from the base substrate 01, and the second gate insulation layer 21 covers the second active layer 20. The second gate metal layer 22 is provided on a side of the second gate insulation layer 21 away from the base substrate 01, and the second gate metal layer 22 includes a gate of the oxide transistor. The second interlayer dielectric layer 23 is provided on a side of the second gate metal layer 22 away from the base substrate 01, and the second interlayer dielectric layer 23 covers the second gate metal layer 22.

In some embodiments of the present disclosure, the first metal layer 30 is provided on a side of the second interlayer dielectric layer 23 away from the base substrate 01. The first metal layer 30 includes a source and a drain of the low temperature polysilicon transistor, and a source and a drain of the oxide transistor. The source and the drain of the low temperature polysilicon transistor are connected to the first active layer 10, and the source and the drain of the oxide transistor are connected to the second active layer 20.

As illustrated in FIGS. 6 to 8, the transistors in the first shift register unit 111 and the second shift register unit 121 may be made together with the transistor in the pixel circuit 200. For example, the first active layer 10 may further include an active region of the transistor in the first shift register unit 111 and an active region of the transistor in the second shift register unit 121. The first gate metal layer 12 may further include a gate of the transistor in the first shift register unit 111 and a gate of the transistor in the second shift register unit 121. Of course, in some embodiments, the second active layer 20 may further include an active region of the transistor in the first shift register unit 111 and an active region of the transistor in the second shift register unit 121, and the second gate metal layer 22 may further include a gate of the transistor in the first shift register unit 111 and a gate of the transistor in the second shift register unit 121, which is not limited in the present disclosure herein.

It should be noted here that when the pixel circuit 200 does not contain an oxide transistor, the first metal layer 30 may be provided on a side of the first interlayer dielectric layer 13 away from the base substrate 01, including a source and a drain of the low temperature polysilicon transistor.

In some embodiments of the present disclosure, the display panel further includes a planarization layer 31 provided on a side of the first metal layer 30 away from the base substrate 01. The planarization layer 31 covers the first metal layer 30. The second metal layer 40 is provided on a side of the first shift register unit 111 away from the base substrate 01, that is, provided on a side of the transistor away from the base substrate 01 in the pixel circuit 200. Specifically; the second metal layer 40 may be provided on a side of the planarization layer 31 away from the base substrate 01, that is, the planarization layer 31 is provided between the first metal layer 30 and the second metal layer 40.

In some embodiments of the present disclosure, an orthographic projection of the planarization layer 31 on the base substrate 01 covers a gap between orthographic projections of a first sub-shift register unit 1111 and a second sub-shift register unit 1112 on the base substrate 01. In the related art, a groove is defined between the planarization layers 31 corresponding to each circuit in the peripheral circuit 100, and the groove may increase a size of the bezel of the display panel to a certain extent.

The orthographic projection of the planarization layer 31 on the base substrate 01 may cover a gap between the orthographic projections of the light-emitting control circuit 120 and the gate driving circuit 110 on the base substrate 01. That is, it covers the gap between the orthographic projections of the first shift register unit 111 and the second shift register unit 121 on the base substrate 01.

As illustrated in FIGS. 4 to 7, in some embodiments of the present disclosure, the display panel further includes an initial signal line VIL located at the peripheral region 011. The initial signal line VIL is configured to transmit an initial signal to the pixel circuit 200, and the initial signal line VIL is distributed in the second metal layer 40.

In the present disclosure, the initial signal lines VIL may be distributed at different positions of the second metal layer 40. As illustrated in FIGS. 4 and 6, in some embodiments of the present disclosure, an orthographic projection of the initial signal line VIL on the base substrate 01 at least partially overlaps with the orthographic projection of the first shift register unit 111 on the base substrate 01. In the present embodiment, the initial signal line VIL is provided above the first shift register unit 111, which reduces a space occupied by the initial signal line VIL along the direction parallel to the base substrate 01, and helps to further reduce the bezel of the display panel.

In some embodiments of the present disclosure, the gate driving circuit 110 includes a first gate driving circuit 130 and a second gate driving circuit 140, the first shift register unit 111 includes a first sub-shift register unit 1111 and a second sub-shift register unit 1112, the first gate driving circuit 130 includes the first sub-shift register unit 1111, and the second gate driving circuit 140 includes the second sub-shift register unit 1112. The second gate driving circuit 140 is located on a side of the first gate driving circuit 130 close to the display region 010. The first gate driving circuit 130 and the second gate driving circuit 140 may be configured to drive different types of transistors.

The plurality of signal lines 112 contained in the first gate driving circuit 130 and the plurality of signal lines 112 contained in the second gate driving circuit 140 may be distributed in at least two layers of the multi-layer metal layer, or only the plurality of signal lines 112 of the first gate driving circuit 130 may be distributed in at least two layers of the multi-layer metal layer, or only the plurality of signal lines 112 of the second gate driving circuit 140 may be distributed in at least two layers of the multi-layer metal layer, which is not limited in the present disclosure herein.

In some embodiments of the present disclosure, the orthographic projection of the initial signal line VIL on the base substrate 01 at least partially overlaps with an orthographic projection of the second sub-shift register unit 1112 on the base substrate 01. Of course, the orthographic projection of the initial signal line VIL on the base substrate 01 may also at least partially overlap with an orthographic projection of the first sub-shift register unit 1111 on the base substrate 01.

The first gate driving circuit 130 and the second gate driving circuit 140 may be configured to drive different types of transistors. For example, the first gate driving circuit 130 may be configured to drive an N-type transistor, and the second gate driving circuit 140 may be configured to drive a P-type transistor.

In some embodiments of the present disclosure, the pixel circuit 200 includes a P-type transistor and an N-type transistor, for example, the pixel circuit 200 includes a low temperature polysilicon transistor and an oxide transistor, and the low temperature polysilicon transistor is the P-type transistor and the oxide transistor is the N-type transistor. The first gate driving circuit 130 provides a high-level voltage signal for driving the oxide transistor, and the second gate driving circuit 140 provides a low-level voltage signal for driving the low temperature polysilicon transistor.

As illustrated in FIGS. 5 and 7, in other embodiments of the present disclosure, the initial signal line VIL is provided at a side of the electrical connection line LL away from the base substrate 01. That is, the electrical connection line LL is located on a side of the second metal layer 40 close to the base substrate 01. Specifically, in some embodiments, the electrical connection line LL may be distributed in the first gate metal layer 12, the second gate metal layer 22, or the first metal layer 30, which is not specifically limited herein. As mentioned above, the electrical connection line LL includes the light-emitting control signal line EML and the gate line GAL, and the light-emitting control signal line EML and the gate line GAL may be distributed in the first gate metal layer 12, the second gate metal layer 22 or the first metal layer 30. For example, the gate line GAL is distributed in the first gate metal layer 12 or the second gate metal layer 22, and the light-emitting control signal line EML is distributed in the first metal layer 30. Of course, there may also be other distribution manner, which are not limited in the present disclosure herein.

In the present embodiment, an orthographic projection of the initial signal line VIL on the base substrate 01 at least partially overlaps with an orthographic projection of the electrical connection line LL on the base substrate 01, which may also reduce the space occupied by the initial signal line VIL along the direction parallel to the base substrate 01, and help to further reduce the bezel of the display panel.

In addition, as illustrated in FIGS. 6 and 7, the orthographic projection of the planarization layer 31 of the present disclosure on the base substrate 01 may also cover the gap between the orthographic projections of the first sub-shift register unit 1111 and the second sub-shift register unit 1112, and that is, no groove is defined between the planarization layers 31 corresponding to the first gate driving circuit 130 and the second gate driving circuit 140, which helps to reduce a size of the bezel of the display panel.

In the present disclosure, the bezel of the display panel may also be further reduced by other manners.

As illustrated in FIGS. 6 and 7, in some embodiments of the present disclosure, the display panel further includes a cathode signal line VSS and a cathode lapping line VSS1. The cathode signal line VSS is provided on a side of the base substrate 01 and located at the peripheral region 011. The cathode signal line VSS is distributed in the first metal layer 30. The cathode signal line VSS is configured to provide a cathode signal to the light-emitting component. An end of the cathode lapping line VSS1 laps the cathode signal line VSS, and at least a part of the cathode lapping line VSS1 is distributed in the second metal layer 40.

In the present embodiment, the cathode lapping line VSS1 laps the cathode signal line VSS, which provides the possibility to reduce a width of the cathode signal line VSS and also provides a certain basis for further reducing the bezel of the display panel.

In some embodiments of the present disclosure, the cathode signal line VSS is located on a side of the light-emitting control circuit 120 away from the display region 010. An orthographic projection of the cathode lapping line VSS1 on the base substrate 01 at least partially overlaps with the orthographic projection of the second shift register unit 121 on the base substrate 01.

In some embodiments of the present disclosure, the display panel further includes an encapsulation layer 50 provided on sides of the driving circuit and the multi-layer metal layer away from the base substrate 01.

The encapsulation layer 50 includes a first inorganic layer 51 and a second inorganic layer 52 arranged in sequence along a direction away from the base substrate 01. An orthographic projection of the second inorganic layer 52 on the base substrate 01 covers an orthographic projection of the first inorganic layer 51 on the base substrate 01, and an area of the orthographic projection of the second inorganic layer 52 on the base substrate 01 is greater than an area of the orthographic projection of the first inorganic layer 51 on the base substrate 01. That is, a distance between a boundary of the second inorganic layer 52 away from the display region 010 and the display region 010 is greater than a distance between a boundary of the first inorganic layer 51 away from the display region 010 and the display region 010. Specifically, the first inorganic layer 51 is provided a first side wall away from the display region 010 and a first surface away from the base substrate 01. The second inorganic layer 52 is in contact with the first side wall and at least a part of the first surface, thus wrapping the first inorganic layer 51. In the present embodiment, the second inorganic layer 52 wraps the first inorganic layer 51, reducing or eliminating a contact length between the second inorganic layer 52 and the first inorganic layer 51 along a direction parallel to the base substrate 01, which helps to improve the water-blocking and moisture-proof effect of the encapsulation layer 50, and helps to further reduce the bezels of the display panel.

As illustrated in FIGS. 1, 4 and 7, the present disclosure also provides a preparation method of a display panel, including steps S100 and S200:

in step S100: a base substrate 01 is provided, the base substrate 01 includes a display region 010 and a peripheral region 011 located at a periphery of the display region 010:

in step S200, a driving circuit and a multi-layer metal layer are formed on a side of the base substrate 01, the driving circuit includes a peripheral circuit 100 and a pixel circuit 200, the peripheral circuit 100 is located at the peripheral region 011, the pixel circuit 200 is located at the display region 010, and the peripheral circuit 100 is connected with the pixel circuit 200 and configured to provide a driving signal to the pixel circuit 200: the peripheral circuit 100 includes a plurality of signal lines distributed in at least two layers of the multi-layer metal layer.

As illustrated in FIGS. 6 and 7, in some embodiments of the present disclosure, the preparation method of the display panel further includes steps S300 and S400:

in step S300, a first inorganic layer 51 is formed on sides of the driving circuit and the multi-layer metal layer away from the base substrate 01:

in step S400, a second inorganic layer 52 is formed on a side of the first inorganic layer 51 away from the base substrate 01: an orthographic projection of the second inorganic layer 52 on the base substrate 01 covers an orthographic projection of the first inorganic layer 51 on the base substrate 01, and an area of the orthographic projection of the second inorganic layer 52 on the base substrate 01 is greater than an area of the orthographic projection of the first inorganic layer 51 on the base substrate 01.

The embodiments of the present disclosure provide a display apparatus, and the display apparatus may include the display panel of any of the above-mentioned embodiments and for its specific structure and beneficial effects, reference may be made to the above-mentioned touch display panel embodiments, which will not be repeated here. The display apparatus of the present disclosure may be an electronic device, such as a mobile phone, a tablet computer, a TV, etc., which will not be listed one by one here.

It should be noted that although each step of the method in the present disclosure is described in a particular order in the drawings, this is not required or implied that these steps must be performed in the particular order, or all the steps illustrated must be performed to achieve a desired result. Additionally or alternatively, certain steps may be omitted, multiple steps may be combined into one step for execution, and/or one step may be decomposed into multiple steps for execution, and so on, which should also be considered as a part of the present disclosure.

It should be understood that the present disclosure does not limit its application to the detailed structure and arrangement of components proposed in the specification. The present disclosure has other embodiments, and the embodiments may be implemented and executed in various ways. The deformations and modifications are within the protection scope defined by the claims of the embodiments of the present disclosure and equivalent technologies, and do not depart from the spirit and scope of the embodiments of the present disclosure. It should be understood that the present disclosure disclosed in this specification extends to all alternative combinations of two or more individual features mentioned in the text and/or drawings. All these different combinations constitute multiple alternative aspects of the present disclosure. The embodiments described in this specification illustrate the best way known for implementing the present disclosure, and those skilled in the art may utilize the present disclosure.

What is claimed is:

1. A display panel, comprising a base substrate, a driving circuit provided on a side of the base substrate and a multi-layer metal layer;
   wherein the base substrate comprises a display region and a peripheral region located at a periphery of the display region;
   the driving circuit comprises a peripheral circuit and a pixel circuit, the peripheral circuit is located at the peripheral region, the pixel circuit is located at the display region, and the peripheral circuit is connected with the pixel circuit and configured to provide a driving signal to the pixel circuit;
   the peripheral circuit comprises a plurality of signal lines distributed in at least two layers of the multi-layer metal layer;
   wherein the multi-layer metal layer comprises a first metal layer and a second metal layer arranged in sequence along a direction away from the base substrate, and the plurality of signal lines comprise a clock signal line and a voltage signal line;
   wherein the peripheral circuit comprises a gate driving circuit, the gate driving circuit comprises a plurality of first shift register units in a cascade connection and the plurality of signal lines, and the first shift register unit comprises a transistor;
   the clock signal line is configured to transmit a clock signal to the first shift register unit, and the voltage signal line is configured to transmit a voltage signal to the first shift register unit;
   the first metal layer comprises a source and a drain of the transistor in the first shift register unit;
   the second metal layer is provided on a side of the first shift register unit away from the base substrate;
   an orthographic projection of the signal line, distributed in the second metal layer, in the gate driving circuit on the base substrate at least partially overlaps with an orthographic projection of the first shift register unit on the base substrate.

2. The display panel according to claim 1, wherein the peripheral circuit comprises a light-emitting control circuit, and the light-emitting control circuit comprises the plurality of signal lines;
   at least one of the plurality of signal lines of the gate driving circuit or the plurality of signal lines of the light-emitting control circuit are distributed in at least two layers of the multi-layer metal layer.

3. The display panel according to claim 2, wherein among the plurality of signal lines, a part of the signal lines are distributed in the first metal layer, and a part of the signal lines are distributed in the second metal layer.

4. The display panel according to claim 3, wherein the peripheral circuit comprises the light-emitting control circuit, the light-emitting control circuit comprises a plurality of second shift register units in a cascade connection and the plurality of signal lines, and the second shift register unit comprises a transistor;
   the clock signal line is configured to transmit a clock signal to the second shift register unit, and the voltage signal line is configured to transmit a voltage signal to the second shift register unit;
   the first metal layer comprises a source and a drain of the transistor in the second shift register unit;
   the second metal layer is provided on a side of the second shift register unit away from the base substrate;
   an orthographic projection of the signal line, distributed in the second metal layer, in the light-emitting control circuit on the base substrate at least partially overlaps with an orthographic projection of the second shift register unit on the base substrate.

5. The display panel according to claim 4, further comprising:
   a cathode signal line, provided on a side of the base substrate and located at the peripheral region, wherein the cathode signal line is distributed in the first metal layer,
   a cathode lapping line with an end lapping the cathode signal line, wherein at least a part of the cathode lapping line is distributed in the second metal layer.

6. The display panel according to claim 5, wherein the cathode signal line is provided on a side of the light-emitting control circuit away from the display region;
   an orthographic projection of the cathode lapping line on the base substrate at least partially overlaps with the orthographic projection of the second shift register unit on the base substrate.

7. The display panel according to claim 1, further comprising an initial signal line, the initial signal line located at the peripheral region and configured to transmit an initial signal to the pixel circuit, wherein the initial signal line is distributed in the second metal layer.

8. The display panel according to claim 7, wherein an orthographic projection of the initial signal line on the base substrate at least partially overlaps with the orthographic projection of the first shift register unit on the base substrate.

9. The display panel according to claim 8, wherein the gate driving circuit comprises a first gate driving circuit and a second gate driving circuit, the first shift register unit comprises a first sub-shift register unit and a second sub-shift register unit, the first gate driving circuit comprises the first sub-shift register unit, and the second gate driving circuit comprises the second sub-shift register unit, the second gate driving circuit is located on a side of the first gate driving circuit close to the display region;

the orthographic projection of the initial signal line on the base substrate at least partially overlaps with an orthographic projection of the second sub-shift register unit on the base substrate.

10. The display panel according to claim 9, wherein the pixel circuit comprises a low temperature polysilicon transistor and an oxide transistor;

the first gate driving circuit is configured to drive the oxide transistor, and the second gate driving circuit is configured to drive the low temperature polysilicon transistor.

11. The display panel according to claim 9, further comprising:

a planarization layer, provided between the first metal layer and the second metal layer, wherein an orthographic projection of the planarization layer on the base substrate covers a gap between orthographic projections of the first sub-shift register unit and the second sub-shift register unit on the base substrate.

12. The display panel according to claim 7, further comprising an electrical connection line, wherein the peripheral circuit is connected with the pixel circuit through the electrical connection line;

the initial signal line is provided on a side of the electrical connection line away from the base substrate;

an orthographic projection of the initial signal line on the base substrate at least partially overlaps with an orthographic projection of the electrical connection line on the base substrate.

13. The display panel according to claim 1, further comprising:

an encapsulation layer, provided on sides of the driving circuit and the multi-layer metal layer away from the base substrate;

wherein the encapsulation layer comprises a first inorganic layer and a second inorganic layer arranged in sequence along a direction away from the base substrate, an orthographic projection of the second inorganic layer on the base substrate covers an orthographic projection of the first inorganic layer on the base substrate, and an area of the orthographic projection of the second inorganic layer on the base substrate is greater than an area of the orthographic projection of the first inorganic layer on the base substrate.

14. The display panel according to claim 13, wherein the first inorganic layer is provided with a first surface away from the base substrate and a first side wall away from the display region;

the second inorganic layer is in contact with the first side wall and at least a part of the first surface.

15. A preparation method of a display panel, comprising:

providing a base substrate, wherein the base substrate comprises a display region and a peripheral region located at a periphery of the display region;

forming a driving circuit and a multi-layer metal layer on a side of the base substrate, wherein the driving circuit comprises a peripheral circuit and a pixel circuit, the peripheral circuit is located at the peripheral region, the pixel circuit is located at the display region, and the peripheral circuit is connected with the pixel circuit and configured to provide a driving signal to the pixel circuit; the peripheral circuit comprises a plurality of signal lines distributed in at least two layers of the multi-layer metal layer;

wherein the multi-layer metal layer comprises a first metal layer and a second metal layer arranged in sequence along a direction away from the base substrate, and the plurality of signal lines comprise a clock signal line and a voltage signal line;

wherein the peripheral circuit comprises a gate driving circuit, the gate driving circuit comprises a plurality of first shift register units in a cascade connection and the plurality of signal lines, and the first shift register unit comprises a transistor;

the clock signal line is configured to transmit a clock signal to the first shift register unit, and the voltage signal line is configured to transmit a voltage signal to the first shift register unit;

the first metal layer comprises a source and a drain of the transistor in the first shift register unit;

the second metal layer is provided on a side of the first shift register unit away from the base substrate;

an orthographic projection of the signal line, distributed in the second metal layer, in the gate driving circuit on the base substrate at least partially overlaps with an orthographic projection of the first shift register unit on the base substrate.

16. The preparation method of the display panel according to claim 15, further comprising:

forming a first inorganic layer on sides of the driving circuit and the multi-layer metal layer away from the base substrate;

forming a second inorganic layer on a side of the first inorganic layer away from the base substrate, wherein an orthographic projection of the second inorganic layer on the base substrate covers an orthographic projection of the first inorganic layer on the base substrate, and an area of the orthographic projection of the second inorganic layer on the base substrate is greater than an area of the orthographic projection of the first inorganic layer on the base substrate.

17. A display apparatus, comprising a display panel, wherein the display panel includes a base substrate, a driving circuit provided on a side of the base substrate and a multi-layer metal layer;

wherein the base substrate comprises a display region and a peripheral region located at a periphery of the display region;

the driving circuit comprises a peripheral circuit and a pixel circuit, the peripheral circuit is located at the peripheral region, the pixel circuit is located at the display region, and the peripheral circuit is connected with the pixel circuit and configured to provide a driving signal to the pixel circuit;

the peripheral circuit comprises a plurality of signal lines distributed in at least two layers of the multi-layer metal layer;

wherein the multi-layer metal layer comprises a first metal layer and a second metal layer arranged in sequence along a direction away from the base substrate, and the plurality of signal lines comprise a clock signal line and a voltage signal line;

wherein the peripheral circuit comprises a gate driving circuit, the gate driving circuit comprises a plurality of first shift register units in a cascade connection and the plurality of signal lines, and the first shift register unit comprises a transistor;

the clock signal line is configured to transmit a clock signal to the first shift register unit, and the voltage signal line is configured to transmit a voltage signal to the first shift register unit;

the first metal layer comprises a source and a drain of the transistor in the first shift register unit;

the second metal layer is provided on a side of the first shift register unit away from the base substrate;

an orthographic projection of the signal line, distributed in the second metal layer, in the gate driving circuit on the base substrate at least partially overlaps with an orthographic projection of the first shift register unit on the base substrate.

18. The display apparatus according to claim 17, wherein the peripheral circuit comprises a light-emitting control circuit, and the light-emitting control circuit comprises the plurality of signal lines;

at least one of the plurality of signal lines of the gate driving circuit or the plurality of signal lines of the light-emitting control circuit are distributed in at least two layers of the multi-layer metal layer.

19. The display apparatus according to claim 18, wherein among the plurality of signal lines, a part of the signal lines are distributed in the first metal layer, and a part of the signal lines are distributed in the second metal layer.

* * * * *